United States Patent Office 2,909,706
Patented Oct. 20, 1959

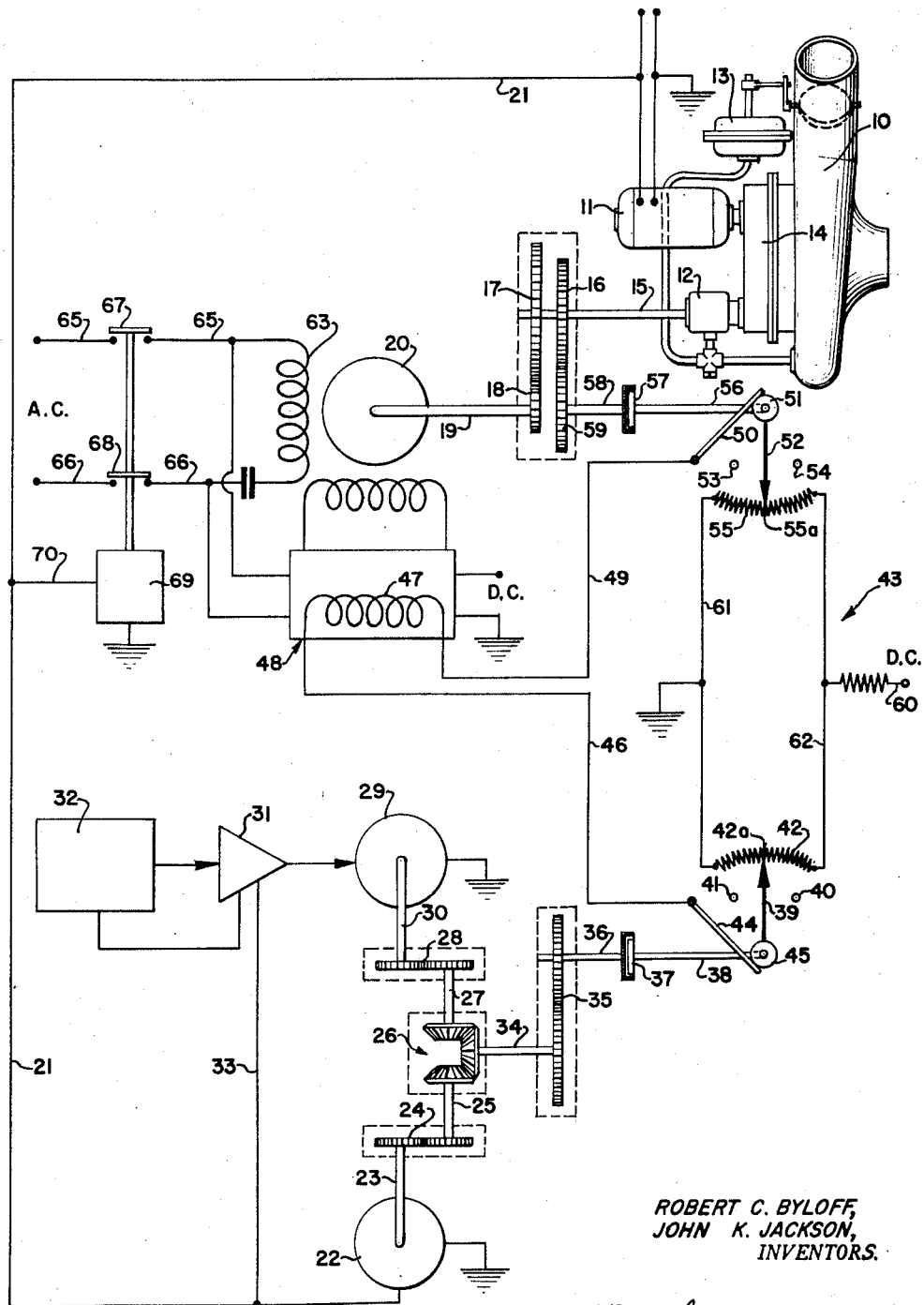

2,909,706

FINE SPEED CONTROL

Robert C. Byloff, Gardena, Calif., and John K. Jackson, Phoenix, Ariz., assignors to The Garrett Corporation, Los Angeles, Calif., a corporation of California Application October 27, 1955, Serial No. 543,156

12 Claims. (Cl. 317—5)

This invention relates to a fine speed control, and more particularly to an improvement of a fine speed control disclosed in our co-pending application, Serial No. 487,774, filed February 14, 1955.

Speed controlling devices are employed to regulate the operation of alternators and other devices which must function at certain frequencies or speeds. Alternators, for example, may be used to provide power for operating electronic equipment, the accuracy of which depends on precise alternator output frequency. In order to obtain alternator frequency within useable limits for the operation of some electronic devices, or other equipment, it has been necessary to regulate speed variations of an alternator within 0.1 percent of its desired shaft speed. Such close speed tolerances may be indicated in the operation of precise machine tools or in the functioning of various other devices which must operate with extreme accuracy.

While various types of speed controlling devices are known, many of them employ chronometric devices having escapement mechanisms which serve as reference mediums in relation to desired speeds. It has been recognized that chronometric devices having escapement mechanism are susceptible to errors as a result of temperature changes and that they are adversely affected by vibration. In addition, normal bearing wear within chronometric devices having escapement mechanisms seriously affects their accuracy over a considerable period of time. Therefore, chronometric devices having escapement mechanisms are undesirable as speed reference devices when operating under varying conditions and over a considerable length of time. Furthermore, chronometric devices having escapement mechanisms are generally bulky in proportion to their output torque, which is normally utilized by the speed controlling devices with which they are associated.

An object of the present invention is to provide an extremely accurate fine speed control means for use in regulating the governed speed of a prime mover, or other device.

Another object of the invention is to provide an extremely accurate fine speed control means which is very compact and light in proportion to its function.

Another object of the invention is to provide a fine speed control means having a novel cooperative arrangement of a resonating device and a differential means for the purpose of adjusting a speed controlling governor in accordance with speed variations in the device controlled by the governor and in relation to the frequency of the resonator, the latter acting as a speed reference medium.

An additional object of the invention is to provide a fine speed control means which will automatically compensate for inaccuracy of a speed control governor when operating under a variety of conditions and which will also compensate for normal inefficiency and wear of the governor tending to cause deviations in its control functions.

A still further object of the invention is to provide a fine speed control having a novel combination comprising a governor trim motor operated in accordance with the input of a magnetic amplifier which is controlled by a null balance bridge having a pair of variable elements, one of which is operated by the governor trim motor and the other of which is operated by means which senses an error in speed of a device regulated by a governor.

In addition to the foregoing, other objects and advantages of the invention will be apparent when reference is made to the following specification, appended claims and accompanying drawings in which:

The figure of the drawing is a diagrammatic view of a fine speed control means in accordance with the present invention and operably connected to a prime mover to be controlled.

The present invention is distinguished from that as disclosed in our former application, Serial No. 487,774, as follows.

A magnetic amplifier, governor trim motor, and null balance bridge all cooperating with a speed error signaling device provide for very accurate proportional governor trim and feedback operation. This proportional governor trimming and feedback operation distinguishes from a switch operated pulsing system, as shown in our former application above referred to. A switch operated pulsing system causes slightly irregular operation of the governor trim motor when the controlling switches therefor are abruptly opened and closed. By contrast, the present proportional governor trim and feedback operation of the present invention provides for governor trimming whereby operation of the governor trim motor is proportional to speed error and feedback signals which cause a gradual trimming of the governor rather than abrupt starting and stopping operations such as those caused by switching operation of the governor trim motor. In addition, it will be noted that the present invention is distinctive due to the cooperation of the null balance bridge with the magnetic amplifier and the speed error signaling means whereby concurrent proportional governor trim and feedback operation are provided for by the null balance bridge.

The fine speed control means, according to the present invention, is adaptable to a variety of installations wherein extremely accurate speed control is necessary, and it is particularly useful in aircraft or other similar installations wherein compactness and light weight are distinct advantages. This fine speed control means maintains its accuracy within 0.1 percent of a desired shaft speed when operating throughout a great environmental range of temperatures and vibration. The present invention utilizes a tuning fork resonator as a speed reference medium. This tuning fork resonator excites an amplifier which furnishes alternating current to a synchronous motor. The tuning fork resonator, for example, is capable of operating at 400 cycles per second ±0.01 percent of such frequency. A tuning fork has virtually no wearing characteristics, and a good fork is capable of maintaining the above cyclic accuracy under vibration and extreme temperature changes. The tuning fork resonator is a very compact device; however, the present fine speed control means may be operated with an equivalent resonating device comprising a crystal and oscillator, together with an amplifier for operating a synchronous motor.

The present invention employs a resonating device to control the operation of a synchronous motor, the output speed of which serves as a medium for comparison with the speed of a governed device. The comparison of the output speed of the synchronous motor with that of the governed device is made by means of a computing differential mechanism. The computing differential mechanism is provided with an output shaft which operates means to trim the governor of the governed device. The governor may be one of several different speed responsive mechanisms wherein a spring biased centrifugal mechanism responds to the speed of the governed device. The present fine speed control means thus serves to adjust the spring bias of the speed responsive governor and does so within very precise limits. It will be understood that the present fine speed control may be employed to adjust speed controlling governors having various mechanical, electrical, or other arrangements.

Referring to the drawing, it will be seen that a fluid operated motor 10 serves as a prime mover for operating an alternator 11. It will be understood that for the purposes and uses of the invention the motor 10 is the equivalent of any prime mover or any other device requiring fine speed control. It will also be apparent that the speed of the motor may be controlled for purposes other than the operation of the alternator 11. The fluid operated motor 10 is provided with a conventional governor 12 which is responsive to the speed of the motor and which controls the same within a range of substantially 2 percent variation of its shaft speed. The governor 12 controls a pneumatic actuator 13 which regulates the flow of fluid to the motor.

For the purposes of illustration, the motor 10 is a pneumatically operated turbine having a gear box 14 by means of which the alternator 11 and governor 12 are driven.

The governor 12 is a conventional governor constructed as shown in Fig. 6 of the drawing in our co-pending application hereinbefore referred to. This governor 12 is arranged to modulate pneumatic force applied to the actuator 13 and is provided with conventional centrifugal responsive mechanism opposed by a spring, the compressive loading of which is adjustable by means of a shaft 15. The shaft 15 is driven by gears 16, 17, and 18 and the shaft 19 of a governor trim motor 20 which provides torque for adjusting the tension of the bias spring in the governor 12.

Electrically connected with the output of the alternator 11 is a conductor 21 which is coupled to a synchronous motor 22 which operates in accordance with the speed of the motor 10 and alternator 11. The synchronous motor 22 is provided with an output shaft 23 coupled to a reduction gear train 24 having an output shaft 25 connected with a computing differential 26. The reduction gear train 24 provides for a sufficient increase in torque from the synchronous motor 22 in order properly to operate the computing differential. The computing differential 26 is provided with another input shaft 27 connected to a reduction gear train 28 which is coupled to a synchronous motor 29 by means of a shaft 30. The synchronous motor 29 operates in accordance with the output of an amplifier 31 which is excited by a tuning fork resonator 32.

This tuning fork is capable of operating at 400 cycles a second ±0.01 percent of such cycle rate. Power for operating the tuning fork amplifier 31 is derived by means of a conductor 33 coupled to the alternator output conductor 21. While the tuning fork resonator provides a precise cycle reference for the synchronous motor 29, the computing differential 26 serves to compare input speeds of the synchronous motors 29 and 22 in order to compare the speed of the governed motor 10 with the cycle rate of the tuning fork resonator 32.

The design arrangement of the present fine speed control is such that the desired speed of the shaft 23 is equal to the speed of the shaft 30 which is primarily controlled by the tuning fork resonator 32. An error in the speed of the motor 10, and that of the shaft 23 relative to speed of the shaft 30, causes an output shaft 34 of the computing differential 26 to rotate at a rate proportional to the difference in the speeds of said shafts 23 and 30. The shaft 34 is coupled to a step-up gear train 35 having an output shaft 36 which drives a slip clutch 37.

Connected to one element of the slip clutch 37 is a shaft 38 having a potentiometer contact arm 39 fixed thereto. This contact arm 39 extends radially from the shaft 38 and operates between stops 40 and 41 which limit movement of the contact arm 39 and cause slippage of the clutch 37 when either of the stops 40 or 41 are engaged by the contact arm 39. The contact arm 39 is arranged to traverse a variable element 42 of a null balance bridge 43. A wiper contact 44 is electrically engaged with a hub portion 45 of the contact arm 39; and connected to this wiper arm 44 is a conductor 46 which is coupled to a control winding 47 of a magnetic amplifier 48 which is arranged to operate the governor trim motor 20, as will be hereinafter described in detail.

A conductor 49 is coupled to the opposite end of the control winding 47 from the conductor 46; and this conductor 49 is electrically connected to a wiper contact 50 which electrically engages a hub 51 of a contact arm 52. The contact arm 52 operates between stop members 53 and 54, whereby traverse of the variable element 55 of the null balance bridge 43 is limited. The contact arm 52 is connected to a shaft 56 driven by a slip clutch 57. When the contact arm 52 engages one of the stops 53 or 54, it stops rotation of the shaft 56 and causes slippage of the clutch 57 which is driven by a shaft 58 having a gear 59 in mesh with the gear 16.

It will be seen that the null balance bridge 43 is provided with a separate power source 60 and that the variable elements 42 and 55 are engaged by the contact arms 39 and 52. Corresponding opposite ends of variable elements 42 and 55 are interconnected by conductors 61 and 62 of the null balance bridge 43. Since the wiper contacts 44 and 50 are electrically coupled to the variable elements 42 and 55 of the null balance bridge 43, they control input to the control winding 47 of the magnetic amplifier 48 which operates the governor trim motor 20.

The main windings 63 of the trim motor 20 are supplied power from a separate source by means of conductors 65 and 66. These conductors 65 and 66 are broken by switch arms 67 and 68, respectively, which are controlled by a relay 69 electrically connected to the conductor 21 by means of a conductor 70. The relay 69 is a frequency sensitive relay of the resonant type which is adapted to close the switch arms 67 and 68 with respect to the conductors 65 and 66 when the output of the alternator 11 is close to its normal desired frequency. It will be understood that the purpose of the relay 69 is to prevent operation of the governor trim motor 20 until the motor 10 has reached a speed which is within the control tolerance of the governor 12. Thus, the relay 69 prevents unwarranted operation of the fine speed control, while the motor 10 is accelerating to its normal governed speed.

Operation of the fine speed control, in accordance with the present invention, is substantially as follows:

When the operation of the motor 10 is initiated, its speed increases until the governor 12 controls the same within a predetermined speed range, as dictated by operation of the governor. While the motor 10 is accelerating to governed speed, the relay 69 holds the contact arms 67 and 68 open with respect to the conductors 65 and 66. When the motor reaches normal output speed, as controlled by the governor 12, the output of the alternator 11 via the conductor 21 furnishes sufficient energy to operate the frequency sensitive relay 69 and to cause the contact arms 67 and 68 to close the conductors 65 and 66.

When the motor 10 is operating at governed speed, the alternator 11 furnishes power to the synchronous motor 22, while the tuning fork 32 and amplifier 31 furnish power, having a precise frequency, to the synchronous motor 29. When the operating speed of the motor 10 varies with reference to the frequency of the tuning fork resonator 32, operating speeds of the motor shafts 23 and 30 vary. Thus, an error in speed of the motor 10 is sensed by the differential 26, whereupon its output shaft 34 rotates at a rate proportional to the speed error of the motor 10. If operating speed of the motor 10 coincides with reference to the cycle rate of the tuning fork resonator 32, the shafts 23 and 30 will rotate at the same rate; and the differential output shaft 34 will remain stationary. When the differential output shaft rotates in accordance with a speed error of the motor 10, the gear train 35 transmits rotary motion to the shaft 36 and slip clutch 37. The shaft 38, connected to the slip clutch 37, rotates the contact arm 39 with respect to the variable element 42 of the null balance bridge 43. This causes a control output from the bridge 43 to the control winding 47 of the magnetic amplifier 48, whereupon operation of the governor trim motor 20 is initiated. The governor trim motor 20 rotates the shaft 19 and the gear train comprising gears 16, 17, 18, and 59. Thus, the governor trim motor 20 causes rotation of the shafts 15 and 58 which are connected to gears 16 and 59 respectively. Rotation of the shaft 15 adjusts the governor 12 in order to correct speed of the motor 10, while rotation of the shaft 58 causes rotation of the slip clutch 57 and contact arm 52 relative to the variable element 55 of the null balance bridge 43. It will be understood that rotation of the contact arm 52 follows rotation of the shaft 38 and contact arm 39 in order to prevent the shaft 15 from making an overadjustment of the governor 12. The following arrangement of the contact arm 52 relative to the contact arm 39 prevents hunting operation of the governor trim motor 20 when adjusting the governor 12 in relation to a speed error of the motor 10 relative to the tuning fork resonator 32, as indicated by rotation of the output shaft 34 of the differential 36.

The stops 40 and 41 limit movement of the contact arm 39 to either one of two extreme positions with respect to the variable element 42. When either of these stops are contacted, continued rotation of the shaft 36 merely causes slippage of the clutch 37 until a speed correction of the motor 10 is accomplished and a reversal of its speed error returns the contact arm 39 to a median null position with respect to the variable element 42.

It will be noted that a partial traverse of the contact arm 39 of the variable element 42 from its null position 42a toward one of the stops 40 or 41 will cause a proportional unbalance of the bridge 43 and a corresponding input to the control winding 47 of the magnetic amplifier 48. This causes an energization of the control winding of the motor 20 which is proportional to the time integral of a speed error of the motor 10 with reference to the tuning fork resonator 32. As the governor trim motor 20 is energized proportional to speed error of the motor 10, it proportionally moves the contact arm 52 in a feedback direction relative to the variable element 55 of the null balance bridge 43. During the approach of a desired governor trim adjustment, operation of the motor 20 may be brief; and movement of the contact arm 52 may traverse only a portion of the variable element 55 from its null position 55a toward one of the stops 53 or 54. Thus, movement of the contact arm 52, by means of the governor trim motor 20, causes the null balance bridge 43 to be gradually adjusted to reduce its input to the control winding 27 of the magnetic amplifier 48 as the adjustment of the governor 12 nears a desired condition. Since both variable elements 42 and 55 of the null balance bridge 53 are capable of being unbalanced in opposite directions from each of the null positions 42a and 55a, the bridge provides for control energization of the magnetic amplifier 48 to operate the governor trim motor 20 in either forward or reverse directions corresponding to an overspeed or underspeed condition of the motor 10.

Operation of the contact arm 39 relative to the variable element 42 is proportional to the time integral of the speed error of the motor 10 with reference to the operation of the resonator 32. Operation of the contact arm 52 relative to the variable element 55 is proportional to operation of the governor trim motor 20 and adjustment of the governor 12 thereby. The proportional operation of the contact arms 39 and 52 is continuous in either directional movement of both of the feed arms in accordance with an overspeed or underspeed condition of the motor 10 and also in accordance with an over or under correction or adjustment of the governor 12 by means of the governor trim motor 20.

When a load is applied to the alternator 11, it causes a speed drop of the motor 10 which may amount to 2 percent of the operating speed thereof. The inertia of the motor 10 tends to resist a speed change thereof, and the governor 12 which is responsive to a speed change immediately starts to correct the speed of the motor 10. Within 0.5 to 1 second, for example, the governor may restore speed of the motor 10 to within 1 percent of its desired operating speed; and within 1 to 2 seconds, the fine speed control, according to the present invention, may restore the motor speed to within 0.1 percent of its desired operating speed. While the above time and percentage values represent operating conditions of an existing fine speed control means in connection with a particular individual motor, it will be understood that different relationships of the motor inertia, load amplified to the motor, and features of the governor may impose different time and proportional requirements upon design and operation of a fine speed control means, according to the present invention. The foregoing description of the various components of the fine speed control means, while it includes some specific time values, is merely an example of the accuracy of which said fine speed control means is capable.

We claim:

1. In a fine speed control, a first device requiring precise speed control, a governor therefor, a servo-motor in connection with said governor for adjusting the same, an amplifier coupled to said servo-motor for energizing it, a null balance bridge in circuit with said amplifier and having a pair of elements variably operable with respect to each other, a time reference means, second means operable by and in accordance with said time reference means and having an output means, a differential device operable by said first device and said output means, said differential device having a differential output means the operation of which corresponds with a variance in operation of said first device and said time reference means, one of the elements of said bridge being connected with and variably operable by said servo-motor, the other of the elements of said bridge being connected with and variably operable by said differential output means.

2. In a fine speed control, a first device requiring precise speed control, a governor therefor, a servo-motor in connection with said governor for adjusting the same, a magnetic amplifier coupled to said servo-motor for energizing it, a potentiometer bridge in circuit with said magnetic amplifier and having a pair of potentiometer elements, a time reference means, second means operable by and in accordance with said time reference means and having an output means, a differential device operable by said first device and said output means, said differential device having a differential output means the operation of which corresponds with a variance in operation of said first device and said time reference means, one of said potentiometer elements being connected with and variably operable by said servo-motor, the other of said potentiometer elements being connected with and variably operable by said differential output means.

3. In a fine speed control, a first device requiring precise speed control, a governor therefor, a servo-motor in connection with said governor for adjusting the same, a magnetic amplifier coupled to said servo-motor for energizing it, a potentiometer bridge in circuit with said magnetic amplifier and having a pair of potentiometer elements, first means coupled to said first device and having a rotating element the rate of which corresponds to the operation of said first device, a time reference means, third means operable by and in accordance with said time reference means and having an output means, a differential device operable by said rotating element and said output means, said differential device having a differential output means the operation of which corresponds with a variance in operation of said rotating element and said time reference means, one of said potentiometer elements being connected with and variably operable by said servo-motor, the other of said potentiometer elements being connected with and variably operable by said differential output means.

4. In a fine speed control, a first device requiring precise speed control, a governor therefor, a servo-motor in connection with said governor for adjusting the same, an amplifier coupled to said servo-motor for energizing it, a null balance bridge in circuit with said amplifier and having a pair of elements variably operable with respect to each other, a time reference means, second means operable by and in accordance with said time reference means and having an output means, a differential device operable by said first device and said output means, said differential device having a differential output means the operation of which corresponds with a variance in operation of said first device and said time reference means, one of the elements of said bridge being connected with and variably operable by said servo-motor, the other of the elements of said bridge being connected with and variably operable by said differential output means, and slip means between the variable elements of said bridge and said servo-motor and differential output means.

5. In a fine speed control, a first device requiring precise speed control, a governor therefor, a servo-motor in connection with said governor for adjusting the same, an amplifier coupled to said servo-motor for energizing it, a null balance bridge in circuit with said amplifier and having a pair of elements variably operable with respect to each other, a time reference means, second means operable by and in accordance with said time reference means and having an output means, a differential device operable by said first device and said output means, said differential device having a differential output means the operation of which corresponds with a variance in operation of said first device and said time reference means, one of the elements of said bridge being connected with said servo-motor for variable operation thereby, the other of the elements of said bridge being connected with said differential output means for variable operation thereby, slip clutch means between the variable elements of said bridge and said servo-motor and differential output means, said variable elements having null positions, and stops spaced from said null positions for limiting variable operation of said variable elements, said stops serving to cause slippage of said clutch means when engaged by said variable elements.

6. In a fine speed control, a first device requiring precise speed control, a governor therefor, a servo-motor in connection with said governor for adjusting the same, an amplifier coupled to said servo-motor for energizing it, a null balance bridge in circuit with said amplifier and having a pair of elements variably operable with respect to each other, a tuning fork time reference means, second means operable by and in accordance with said time reference means and having an output means, and a differential gear mechanism operable by said first device and said output means, said differential gear mechanism having a differential output means the operation of which corresponds with a variance in operation of said first device and said time reference means, one of the elements of said bridge being connected with said servo-motor for variable operation thereby, the other of the elements of said bridge being connected with said differential output means for variable operation thereby.

7. In a fine speed control, a prime mover requiring precise speed control, a speed responsive governor therefor, a servo-motor disposed to adjust said governor, a magnetic amplifier coupled to said servo-motor for energizing it, a potentiometer bridge in circuit with said magnetic amplifier and having a pair of potentiometer elements, a tuning fork frequency reference means, a synchronous motor operated by said frequency reference means, a differential gear mechanism, said synchronous motor and said prime mover being connected to said differential gear mechanism, said differential gear mechanism having a differential output means the operation of which corresponds to a variance in operation of said prime mover and said synchronous motor, the resistance of one of said potentiometer elements being varied by said differential output means and the resistance of the other of said potentiometer elements being varied by said servo-motor; and means responsive to the speed of said prime mover for rendering the fine speed control inoperative when the speed of the prime mover is outside of a predetermined range.

8. A fine speed control for a prime mover driven alternator comprising: a governor disposed to control the speed of the prime mover; a servo-motor disposed to adjust said governor; a differential gear mechanism driven by two synchronous motors; one of said synchronous motors being energized by the output of the alternator and the other synchronous motor being energized by a reference frequency means; two variable resistances connected in series to form the two sides of a normally balanced bridge circuit; one of said variable resistances being controlled by the output of said differential gear means and the other of said variable resistances being controlled by said servo-motor, the unbalance of said bridge being used to energize the control winding of a magnetic amplifier, the output of said magnetic amplifier being coupled to said servo-motor to energize it; and means responsive to the output of the alternator for rendering the fine speed control inoperative when the speed of the prime mover is outside a predetermined range.

9. In a fine speed control, the combination of: a device requiring precise speed control; a governor therefor; a first means operably connected with said governor for adjusting the same; an amplifier for energizing said first means; a potentiometer bridge in circuit with said amplifier and having a pair of potentiometer elements, one of said potentiometer elements being operable by said first means; a time reference means; and a second means controlled in part by said time reference means and in part by said device, said second means having an operative connection with the other of said potentiometer elements to adjust the same in response to a variation in speed of said device with respect to said time reference means.

10. In a fine speed control, the combination of: a device requiring precise speed control; a governor therefor; a first means operably connected with said governor for adjusting the same; an amplifier for energizing said first means; a potentiometer bridge in circuit with said amplifier and having a pair of potentiometer elements, one of said potentiometer elements being operable by said first means; a time reference means; and a synchronous motor means controlled in part by said time reference means and in part by said device, said synchronous motor means having an operative connection with the other of said potentiometer elements to adjust the same in response to a variation in speed of said device with respect to said time reference means.

11. In a fine speed control, the combination of: a device requiring precise speed control; a governor for said device; servo-motor means operably connected with said governor for adjusting the same; amplifier means for energizing said servo-motor means; a potentiometer bridge in circuit with said amplifier and having a pair of potentiometer elements, one of said potentiometer elements being connected for operation by said servo-motor means; a time reference means; a differential means controlled in part by said time reference means and in part by said device, said differential means having an operative connection with the other of said potentiometer elements to adjust the same in response to a variation in speed of said device relative to said time reference means; and means operatively connected with said device and said servo-motor for rendering the latter inoperative until the former reaches a selected range of operating speeds.

12. In a fine speed control, the combination of: a device requiring precise speed control; a governor for said device; a reversible servo-motor operably connected with said governor for adjusting the same; amplifier means for energizing said servo-motor; a potentiometer bridge in circuit with said amplifier and having a pair of potentiometer elements, one of said potentiometer elements being connected for operation by said servo-motor; a tuning fork resonator controlled amplifier; differential means having a pair of synchronous motors and an output member, one of said synchronous motors being controlled by said tuning fork resonator controlled amplifier and the other being controlled by said device, said output member being actuated in response to variation in speed of operation of said device relative to the tuning fork resonator, the other of said potentiometer elements being connected for operation by the output member of said differential means; and a frequency sensitive resonant type relay controlled switch means operatively connected with said device and said servo-motor for rendering the latter inoperative until the former reaches a selected range of operating speeds.

References Cited in the file of this patent

UNITED STATES PATENTS

| | | |
|---|---|---|
| 1,726,908 | Levy | Sept. 3, 1929 |
| 1,787,987 | Livingston | Jan. 6, 1931 |
| 2,302,042 | Martin | Nov. 17, 1942 |
| 2,671,877 | Stewart | Mar. 9, 1954 |
| 2,724,795 | Rusler | Nov. 22, 1955 |
| 2,735,059 | Schaelchlin | Feb. 14, 1956 |
| 2,755,421 | Roosdorp | July 17, 1956 |
| 2,812,481 | Roosdorp | Nov. 5, 1957 |